United States Patent [19]

Galuska

[11] 4,381,645

[45] May 3, 1983

[54] POWER UNIT FOR DAM

[76] Inventor: Charles W. Galuska, G.D. Box 65, APO San Francisco, Calif. 96555

[21] Appl. No.: 222,635

[22] Filed: Jan. 5, 1981

[51] Int. Cl.³ .............................................. F16D 31/02
[52] U.S. Cl. ....................................... 60/398; 137/147; 137/151
[58] Field of Search ................... 60/398; 137/142, 143, 137/147, 151; 290/52

[56] References Cited

U.S. PATENT DOCUMENTS

| | | | |
|---|---|---|---|
| 446,287 | 2/1891 | Graham | 137/147 |
| 969,516 | 9/1910 | Bouchayer | 137/143 |
| 2,363,313 | 11/1944 | Gavin | 137/147 |
| 3,980,894 | 9/1976 | Vary et al. | 290/54 |
| 4,182,123 | 1/1980 | Ueda | 60/398 |

*Primary Examiner*—A. Michael Chambers
*Attorney, Agent, or Firm*—Victor J. Evans & Co.

[57] ABSTRACT

A water power unit for a dam which includes a downwardly directed conduit for directing water from the body of water from the body of water retained by the dam to a water turbine or the like for generating power, the conduit including an upstanding U-shaped section having a bight portion extending above the level of the body of water together with a pump for pumping water entering the conduit around a check valve in the conduit to initially fill the conduit U-shaped section with water so that an increase is obtained as water flows in the conduit to increase the power output of the turbine together with a siphon action obtained within the U-shaped section during the operation of the turbine for further power increase.

9 Claims, 1 Drawing Figure

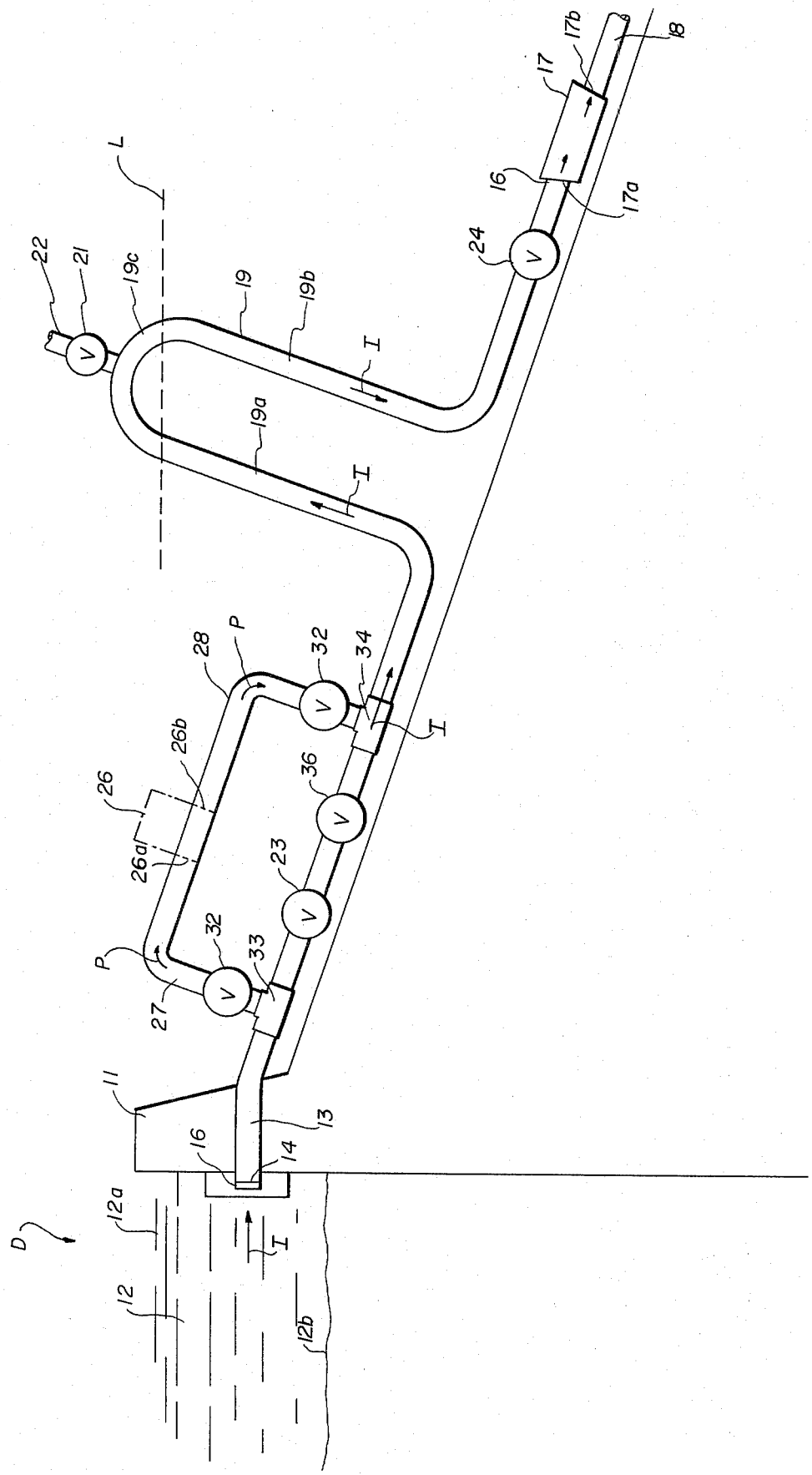

POWER UNIT FOR DAM

BACKGROUND OF THE INVENTION

Water wheel power generators have long been associated with dams in which the pressure head of the body of water retained by the dam is utilized to move water under pressure through a water turbine or the like for the generation of electric power. In the general construction of such hydroelectric dam installations, water is conducted through the dam by a conduit to a location below the dam at which the water turbines are installed. In such a construction, the power generated by the water turbines depends directly and totally on the pressure head of the dammed up body of water. During times of drought or limited water flow into the water reservoir, the pressure head is of course lowered so that a concomitant reduction in power output from the water turbines results. This reduction in power output is, of course, a undesirable condition from a practical standpoint particularly when considering the high capital and, maintenance costs, etc. involved in such dams.

The following patents are representative of the prior art to which the subject invention pertains and are clearly distinguishable both structurally and functionally from the subject invention:

| 1,059,116 | Chapin | 2,688,461 | Simpson |
|---|---|---|---|
| 2,363,313 | Gavin | 3,314,544 | Rosaen |

The Gavin patent relates to a system for conveying a liquid from an upper to a lower level which utilizes a conduit having a plurality of upstanding bent portions therein to permit the liquid to be pumped into the conduit in accordance with siphon principles. Gavin does use a pump for filling the conduit as well including devices for automatically sensing liquid level and starting and restarting the pump but essentially Gavin discloses nothing more relative to applicant's invention other than the use of a siphon in a tube. The Simpson patent relates to a valve for irrigation ditches which includes a conduit for siphoning liquid from one ditch to another, a pump being provided for initiating the siphoning action with a pan-like valve 13 at the discharge end of the conduit.

Rosaen relates to a reservoir for liquid which includes a pump together with a tubular member disposed within the liquid reservoir which operates under the siphon principle with the siphon being produced by the pump. The Chapin patent relates to a siphon conduit for irrigation ditches by means of which liquid is transferred from one ditch to another under siphon action the siphon conduit being primed by simply pouring water into a filling opening in the top of the conduit.

OBJECT AND SUMMARY OF THE INVENTION

Accordingly, a primary object of this invention is to provide a new and novel power generating unit for a dam which utilizes both the pressure head of the water in the reservoir and the siphon principle for driving a power generator such as a water turbine or the like.

Another object of this invention is to provide a new and novel water driven power unit for a dam in which a siphon is incorporated within the dam sluice for increasing the power output of the generator and which permits the siphon action to be continuously maintained throughout the power generating operation.

A further object of this invention is to provide a new and novel power generating system for a dam utilizing a water turbine and a siphon in which the siphoning action may be initiated in a simple and easy manner with a minimum utilization of parts.

Still another object of this invention is to provide a new and novel hydroelectric power installation which permits a maximum amount of power to be obtained from a water wheel power generating unit and in which only temporary use of the priming pump for the siphon incorporated within the system is required.

A still further object of this invention is to provide a new and novel hydroelectric power installation which permits power to be generated by a water turbine under low pressure head conditions.

The objects above and other related objects are accomplished by the provision of water driven power generating means such as a water turbine having a downwardly inclined main water conduit connected to its inlet with the conduit communicating at the other end with the body of water behind the barrier in a dam so as to provide a pressure head. The conduit includes an upwardly extending U-shaped section including a bight portion disposed above the level of the water in the dam reservoir and valve means are provided in the conduit which permit water to flow from the reservoir through the conduit including the U-shaped section into the turbine. Means are provided for initially filling the conduit including the U-shaped section which may be temporarily connected to the conduit by means of valves across a check valve so that the power generating means is driven by both the siphon action in the U-shaped conduit section and the pressure head of the water flowing in the conduit.

Other objects and advantages will become apparent in the following specification when considered in light of the attached drawings.

BRIEF DESCRIPTION OF THE DRAWINGS

The single FIGURE of the drawing illustrates the power unit of the invention in association with a dam.

DESCRIPTION OF THE PREFERRED EMBODIMENT

Referring now to the single FIGURE of the drawing, there is shown a dam designated generally by the letter D of conventional construction which includes a barrier 11 of concrete or the like which, as is well known, is of the type for retaining a body of water 12 having an upper level 12a. Thus, the depth of the body of water 12 forms a pressure head which, as is well known, is utilized for power generation.

In the illustrated embodiment, the power unit of the invention, includes a pipe or conduit 13, one end 14 of which is disposed adjacent the bottom 12b of the body of water 12 with the end portion of the conduit 13 extending through the barrier 11. Preferably, a trash gate 16 is disposed within the conduit one end 14 to prevent debris, trash, fish or the like from entering the conduit 13. Furthermore, the positioning of the conduit end 14 adjacent the bottom 12b of the body of water 12 permits full utilization to be made of the pressure head established in the body of water 12.

The conduit 13 extends downwardly in an inclined position adjacent the barrier 11 and, as is well known, the other end 16 of the conduit 13 is connected to the inlet 17a of power generating means such as a water turbine 17 having an outlet 17b from which the water flowing in the conduit 13 in the direction of the arrows I is discharged into a duct 18 or the like.

The conduit 13 includes a U-shaped section 19 intermediate the conduit ends 14, 16 through which the water flows as it moves through the conduit 13. The U-shaped section 19 includes leg portions 19a, 19b and a bight portion 19c which is disposed above the level of water 12a of the body of water 12 as indicated by the letter L. As can be understood, and as will be explained hereinafter, the provision of the U-shaped section 19 in the conduit 13 permits the use of the siphon principle for increasing the power output of the water turbine 17. Furthermore, the bight portion 19ac of the U-shaped section 19 includes an air vent valve 21 disposed in a duct 22 through which air trapped in the section 19 may be vented.

Valve means are provided in the conduit 13 for permitting water to flow from the body of water 12 through the conduit 13 including the U-shaped section 19 into the power generating means or water turbine 17. More specifically, a shut-off valve 23 is provided in the conduit 13 between the conduit one end 14 and the leg 19a of the U-shaped section 19. In addition, a shut off valve 24 is provided in the conduit 13 between the leg 19b of the U-shaped section 19 and the inlet 16 of the water turbine 17.

The power unit of the invention includes means for initially filling the U-shaped section 19 of the conduit 13 with water flowing in the conduit so that the conduit 13 including the section 19 is completely filled with water thereby priming the section 19 for the siphoning action. More specifically, a pump 26 of conventional construction having an inlet 26a and a outlet 26b is connected to the conduit 13 by means of a suction conduit 27 connected to the pump inlet 26a and a pressure conduit 28 connected to the pump outlet 26b. The suction conduit 27 and pressure conduit 28 are connected through valves 31, 32 to the conduit 13 by suitable means such as Tees 33, 34 respectively on opposite sides of the shut-off valve 23. If desired, the pump 26 may be of the type which may be temporarily installed in communication with the conduits 27, 28 and after the priming operation has been initiated, removed therefrom for utilization in another location. Also, a check valve 36 is provided in the conduit 13 between the shut-off 23 and the Tee 34.

When power is to be generated from the water turbine 17, valves 23, 24 are closed, pump 26 connected to the conduits 27, 28 and valves 31, 32 are open. The pump 26 is then operated so that water entering the end 14 of the conduit 13 flows in the direction of the arrows P through the valves 31, 32 and conduits 27, 28 into the U-shaped section 19 of the conduit 13 filling the section 19. Air contained within the U-shaped section of the conduit 13 is pushed out into the atmosphere through the air vent 21 so that the entire conduit including the section 19 is filled with water. Subsequently, valves 31, 32 are closed, pump 26 being removed if desired, and valves 23, 24 are opened so that water flows continuously from the reservoir 12 due to the pressure head therein through the conduit 13 into the water turbine 17 for generating power such as in a electric generator (not shown). Thus, not only is power generated by the water turbine 17 due to the pressure head of water pushing water along the conduit 13 but the siphoning action occuring in the U-shaped section 19 adds to the water pressure further increasing the power output of the turbine 17.

Having thus described the preferred embodiment of the invention it should be understood that numerous structural modification and adaptations may be resorted to without departing from the spirit of the invention.

What is claimed is:

1. A power unit for a dam having a vertical barrier for retaining a body of water on one side to provide a pressure head comprising, in combination, water driven power generating means, a downwardly inclined main conduit communicating at one end with a horizontal conduit end portion communicating with said body of water through said vertical barrier at a lower portion thereof and communicating at the other end with said power generating means, said conduit having an upwardly extending U-shaped section intermediate the ends of said conduit, said U-shaped section including a bight portion disposed above the level of said body of water, first valve means in said conduit for permitting water to flow from said body of water through said conduit including said U-shaped section into said power generating means and means for initially filling said U-shaped section of said conduit with water flowing to provide a siphon action and to increase the pressure of water flowing into said power generating means wherein said means for initially filling said conduit U-shaped section comprises a pump in a conduit branch having an inlet and an outlet in parallel with said conduit upstream said U shaped section and means including second valve means for communicating said pump conduit branch inlet and outlet with said conduit.

2. A power unit in accordance with claim 1 including a check valve in said conduit between said conduit one end and said U-shaped section in parallel with said pump conduit branch to permit water to flow in one direction only from said conduit one end through said pump conduit branch to said conduit other end.

3. A power unit in accordance with claim 2 wherein said means for communicating said conduit branch inlet and outlet with said conduit includes said pump conduit branch second valve means having an inlet valve for communicating said pump inlet with said conduit between said check valve and said conduit one end and an outlet valve for communicating said pump outlet with said conduit between said check valve and said conduit U-shaped section.

4. A power unit in accordance with claim 3 wherein said first valve means include a first shutoff valve in said conduit between said one conduit end and said check valve in parallel with said pump branch conduit.

5. A power unit in accordance with claim 4 wherein said first valve means include a second shutoff valve in said conduit between said U-shaped section and said power generating means.

6. A power unit in accordance with claim 5 including an air vent in said conduit U-shaped section bight portion.

7. A power unit in accordance with claim 6 wherein said power generating means comprises a water turbine.

8. A power unit in accordance with claim 7 wherein said pump is removably connected to said pump branch conduit.

9. A power unit in accordance with claim 8 including a trash screen in said conduit adjacent said conduit one end.

* * * * *